(12) United States Patent
Kenny et al.

(10) Patent No.: US 6,586,722 B1
(45) Date of Patent: Jul. 1, 2003

(54) STRAIN SENSOR WITH OPTICAL FIBRE BRAGG GRATINGS

(75) Inventors: Robert Patrick Kenny, Ispra (IT); Maurice Patrick Whelan, Ispra (IT); Alfredo Carlo Lucia, Ispra (IT)

(73) Assignee: European Community represented by Commission of the European Communities, Rue Alcide de Gasperi (LU)

( * ) Notice: Subject to any disclaimer, the term of this patent is extended or adjusted under 35 U.S.C. 154(b) by 0 days.

(21) Appl. No.: 09/719,214

(22) PCT Filed: Nov. 11, 1999

(86) PCT No.: PCT/GB99/03760

§ 371 (c)(1),
(2), (4) Date: Feb. 20, 2001

(87) PCT Pub. No.: WO00/28294

PCT Pub. Date: May 18, 2000

(30) Foreign Application Priority Data

Nov. 11, 1998 (GB) .............................................. 9824756

(51) Int. Cl.[7] .................................................. G01I 3/00
(52) U.S. Cl. .................................... 250/227.16; 385/37
(58) Field of Search ....................... 250/227.14, 227.15, 250/227.16, 227.17, 227.18, 227.19; 356/305, 328, 334, 215, 236, 902, 34, 35; 385/37, 9, 10; 340/555, 556, 557

(56) References Cited

U.S. PATENT DOCUMENTS 4,877,300 A * 10/1989 Newhouse et al. ...... 350/96.15
5,726,744 A    3/1998 Magne
6,192,176 B1 *  2/2001 Cassarly et al. .............. 385/32

OTHER PUBLICATIONS

Manuel et al., State–of–strain evaluation with fiber Bragg grating rosetts, Dec. 20, 1997, applied optics, PP9437–9446.*
Udd E et al: "Advanced fiber optic sensors capable of multiparameter sensing" Fourth Pacific Northwest Fiber Optic Sensor Workshop, Troutdale, OR, USA, May, 6–7, 1998, vol. 3489, pp. 66–70, XP002127867 Preceedings of the SPIE—The International Society for Optical Engineering, 1998, SPIE–Int. Soc. Opt. Eng, USA ISSN: 0277–786X.
Electronic Letters Dec., 5th, 1991 vol. 27 No. 25 "Niniature High Performance Fibre Loop Reflector" j. j. Kiely et al. School of Electronics and System Engineering University of Wales College of Cardiff, pp. 2334–2335.
"State–of–Strain Evaluation With Fiber Bragg Grating Rosettes: Application To Discrimation Between Strain and Temperature Effects In Fiber Sensors" Sylvain Magne, Stephane Rougeault, Manuel velela, and Pierre Ferdinand, Dec. 20, 1997 vol. 36, No. 36 applied optics, pp. 9437–9446.

* cited by examiner

Primary Examiner—Robert H. Kim
Assistant Examiner—Hoon K. Song
(74) Attorney, Agent, or Firm—Birch, Stewart, Kolasch & Birch, LLP

(57) ABSTRACT

Strain sensors, and in particular strain rosettes, are described and claimed, in which the strain sensing elements are fiber Bragg gratings. Strain sensors in accordance with the described invention comprise first and second fiber Bragg gratings, and a length of optical fiber connecting the gratings in series, each grating being substantially straight and the two gratings being non-parallel and having different nominal Bragg wavelengths, the connecting length of optical fiber having a bend, characterised in that a portion of the connecting length is tapered, the tapered portion including an elongate waist portion having a reduced cross sectional area and said bend is formed in the waist portion.

14 Claims, 8 Drawing Sheets

$\lambda_b/n_c \approx 2x$ $10^{-5} \lesssim \dfrac{\Delta n}{n_c} \lesssim 10^{-3}$

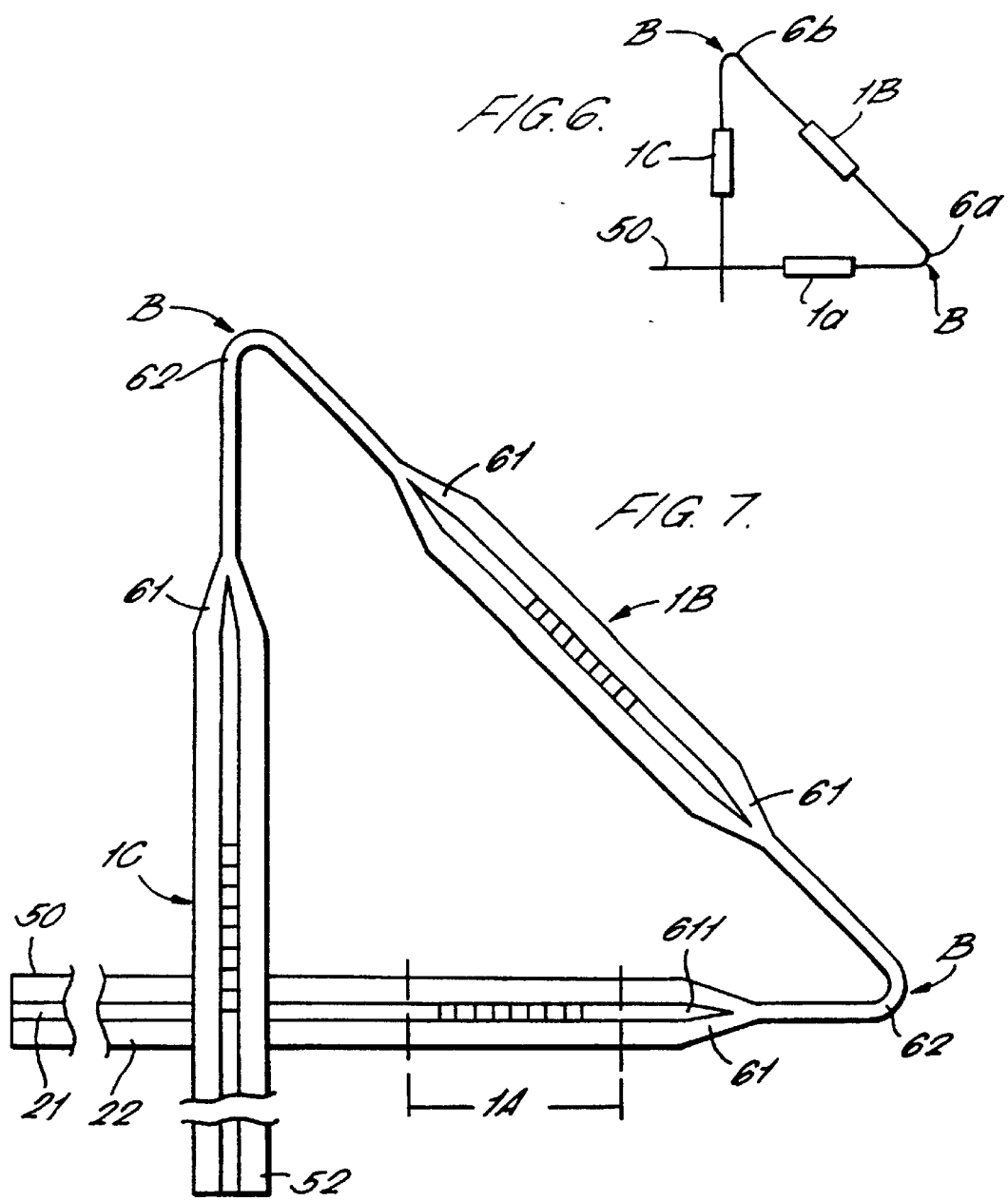
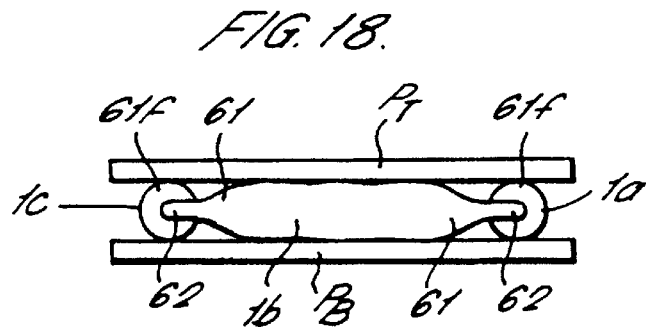

STRAIN SENSOR WITH OPTICAL FIBRE BRAGG GRATINGS

CROSS-REFERENCE TO RELATED APPLICATIONS

This application is the national phase under 35 U.S.C. §371 of PCT International Application No. PCT/GB99/03760 which has an International filing date of Nov. 11, 1999, which designated the United States of America.

BACKGROUND OF THE INVENTION

1. Field of the Invention

The present invention relates to strain sensors and in particular to multi-element strain sensors incorporating fibre Bragg gratings as the strain sensing element.

2. Description of Related Art

Strain rosettes are well known multi-element strain sensors and are widely used in mechanical testing. Strain rosettes typically comprise two or three non co-linear strain gauges mounted on a common substrate. The strain gauges are typically arranged at 45° or 60° to one another, to form rectangular or delta rosettes respectively.

Strain rosettes can be surface mounted or embedded inside structures and used to provide a variety of information on strain fields. For example, strain rosettes can be used to measure components of strain along and perpendicular to a principal axis, or to determine the orientation of the principal axis if it is not already known.

In the past, strain rosettes have typically employed three electrical strain gauges (e.g. resistance strain gauges) as their strain sensing elements. A known rectangular strain rosette is shown schematically in FIG. 1, and includes three resistance strain gauges S1, S2, S3 arranged at 45° to each other. The strain gauges are mounted on a substantially planar common substrate 99 for ease of handling and to maintain their mutual orientation. For optimum results, the individual strain gauges and placed as close together as possible. Separate electrical connections are required to each sensor.

Fibre Bragg gratings are well known and can be used as temperature sensors or strain gauges as alternatives to electrical sensors, providing numerous advantages. Fibre Bragg gratings (FBGs) and their use as sensing elements are described in "Optical Fibre Bragg Grating Sensors: A Candidate for Smart Structure Applications", Dunphy et al, Chapter 10 of Fibre Optic Smart Structures, edited by Eric Udd, 1995 John Wiley & sons, Inc., ISBN 0-471-55448-0.

A typical FBG is shown schematically in FIG. 2(a) the FBG is formed of a length of optical fibre having a core 21 surrounded by cladding material 22 having a lower refractive index than the core. The optical fibre is typically a single mode fibre (mono mode), the core diameter being sufficiently small such that for a chosen light source, light can propagate along the core in only a single mode. The single mode is guided substantially by the core/cladding boundary. The "lines" 11 of the grating are a series of regularly spaced perturbations of the refractive index $N_C$ of the core. The grating extends along a length L of the fibre, where L is typically in the range 1 mm to 20 mm, and the variation of core refractive index along the longitudinal axis Z of the FBG is shown in FIG. 2(b). A variety of techniques can be used to produce FBGs. In one of these techniques, the refractive index perturbations are formed in the core by masking the fibre with a phase mask and exposing it to intense ultra-violet light. In another technique, the index perturbations are formed by exposing the fibre to the interference pattern produced from two intersecting halves of a UV laser beam. The spacing X of the index perturbations is determined by the angle at which the two halves of the beam intersect. The perturbations in core refractive index produced by these techniques are typically of the order of one part in one thousand or less.

The optical fibres used to produce FBGs generally have a Protective coating outside the cladding. Before the fibre is exposed to UV light to form the grating the protective coating is removed. After exposure, the stripped portion of fibre is re-coated to restore its durability.

When a broad spectrum of light is input to the FBG as an input signal, most wavelengths pass through the grating region and form a transmitted output signal 82. However, the periodic index perturbations produce a strong Bragg reflection of components of the input signal having a wavelength $\lambda_b$, the Bragg wavelength, where:

$$\lambda_b = 2XN_C$$

Thus, a tunable detector can be used to look for a peak in the reflected signal, or a trough in the transmitted signal. The wavelength at which the peak or trough occurs therefore gives an indication of the line spacing X of the grating.

When the FBG is subjected to longitudinal strain, the spacing X changes and so results in a shift in the Bragg wavelength. To a good approximation, the Bragg wavelength is proportional to strain along the longitudinal axis. Advantageously, the grating sensor inherently tends to reject the effects of strain fields not aligned with the longitudinal axis.

Advantageously, as strain is determined by measuring the Bragg wavelength, the measurement is not affected by fluctuations in the intensity of the input light.

The fibre Bragg grating provides other advantages associated with fibre optic sensors. For example it is immune to electromagnetic interference, has light weight and small size, exhibits high temperature and radiation tolerance, and is durable even in harsh environments.

Fibre optic strain rosettes employing three separate FBGs as the strain sensing elements are known, in which each FBG has its own input and output fibres, separate from those of the other FBGS. Although the sensing region may be suitably compact (i.e. the FBGs may be arranged close together) the three sets of related fibres are inconvenient.

Rather than connecting separately to each one of an array of FBGS, it is known to instead connect them in series, provided that their nominal Bragg wavelengths are sufficiently different. One such arrangement is shown schematically in FIG. 3. Here, a light source 70 outputs a signal, a portion of which 80 is input to a series string of fibre Bragg gratings 1A, 1B, 1C via a bi-directional coupler C. The three FBGs have different nominal Bragg wavelengths, $\lambda_{BA}$, $\lambda_{BB}$, and $\lambda_{BC}$ respectively and the reflected signal 81 returning to the coupler essentially consists of light at just these three wavelengths. A portion of the reflected signal 81 is input to a light detector 71 via the coupler C. In this example, the light source 70 is a broad band source and the light detector 71 is a tunable narrow band detector. Thus, as the detector scans across a range of wavelengths, intensity peaks will be detected corresponding to the three Bragg wavelengths, and so the strain experienced by each FBG can be determined. Thus, in FIG. 3 the fibre Bragg gratings are multiplexed.

It will be appreciated that in alternative arrangements a tunable narrow band light source may be used in conjunction with a broader band light detector to measure the Bragg wavelengths.

Strain rosettes incorporating series connected fibre Bragg gratings are known and an example is shown schematically in FIG. 4. Here, the optical fibre components of the strain rosette are formed from a single continuous fibre comprising an input portion 50 connected to a first fibre Bragg grating 1A. The first fibre Bragg grating is connected by a connecting loop 6 to the second FBG 1B which in turn is connected by a second loop 6 to a third FBG 1C. The FBGs are arranged at 0°, 45°, and 90° with respect to a nominal axis and the rosette is encapsulated in a thin film of encapsulating material 9. The thickness of the optical fibre is exaggerated in the figure for clarity.

The three FBGs are arranged close together, forming a compact sensing portion, but the overall size of the rosette is significantly larger as a result of the connecting lengths of fibre 6 formed into loops. Although it is desirable to make the loops as small as possible to minimise the overall size of the rosette, the minimum bend radius must be large enough to avoid significant bend loss. For typical optical fibres having a cladding diameter of up to 200 $\mu$m the minimum bend radius without loss is approximately 1 cm. Thus, this large minimum bend radius of the fibres results in a large and cumbersome device when the multiplexed FBG sensors are arranged in the necessary geometry.

Delta rosettes formed of multiplexed FBGs are also known, and are described for example in "State of Strain Evaluation With Fibre Bragg Grating Rosettes" S. Magne et al, Applied Optics, Dec. 20th, 1997, Volume 36, No.36, PP9437–9447. An example of one of these delta rosettes is shown schematically in FIG. 5. The three FBGs, 1A, 1B, 1C are connected in series by two loops L formed in the length of connecting fibre 6, and the FBGs are arranged at 60° to one another. Again, the minimum size of the connecting loops L is determined by the minimum bend radius of the fibre, and results in the rosette having a size of approximately 8 cms.

Thus, the mutual arrangement of the FBG's is dictated by the rosette design and function, and the connecting portions of the fibre 6 have to be appropriately routed from the end of one FBG to the "input" end of another. The fact that the connecting portion of optical fibre cannot be bent over a radius of less than 1 cm without introducing appreciable loss has in the past been a serious constraint on the arrangement of the connecting portions, and has in turn meant that it has been impossible to produce practical FBG strain rosettes smaller than a few centimetres square.

BRIEF SUMMARY OF THE INVENTION

It is an object of the present invention to produce smaller multi-element strain sensors, including FBG strain rosettes, especially for applications where the sensor is to be embedded in a structure. For example, a smaller device may be incorporated without compromising the strength of the structure.

According to a first aspect of the present invention there is provided a strain sensor comprising:

first and second fibre Bragg gratings, and a length of optical fibre connecting the gratings in series, each grating being substantially straight and the two gratings being non-parallel and having different nominal Bragg wavelengths, the connecting length of optical fibre having a bend, characterised in that a portion of the connecting length is tapered, the tapered portion including an elongate waist portion having a reduced cross-sectional area, and said bend is formed in the waist portion.

Thus, the FBG's are multiplexed, and being substantially straight are responsive only to components of strain along their respective longitudinal axes. They are arranged non parallel to respond to different components of strain, and may, for example, be arranged substantially in a common plain at an angle of 60°, 45° or 90° to one another as part of a strain rosette.

Unlike previous FBG strain sensors, the connecting length of optical fibre includes a tapered portion. Tapering of optical fibres is a well known process and typically involves heating a section of the fibre in a flame and then elongating or pulling the section to form a taper waist, or neck, of reduced cross-sectional area. Generally, the taper waist is elongate with a substantially uniform cross-section and the regions of the fibre over which the cross-sectional area reduction occurs are known as the taper transition portions, i.e. the tapered portion typically comprises two taper transition portions and the taper waist portion, with the taper transition portions connecting the taper waist to untapered sections of the fibre.

The present invention exploits the fact that the taper waist portion can be bent over smaller radii than the untapered fibre without loss. Thus, the routing of the connecting length of fibre from one grating to the other can be achieved substantially by means of bends formed in the taper waist portion, and the reduced minimum bend radius places less of a constraint on this routing.

In short, by employing tapered portions in the connecting length, and forming bends of radius less than 10 mm in the taper waist, the routing of the connecting length from one FBG to the next can be more direct, enabling the size of the device to be reduced.

In general, the smaller the cross-sectional area of the taper waist portion, the smaller the minimum acceptable radius of curvature and so the more direct can be the connection. However, the taper waist portion cross-section must be sufficiently large to enable the desired wavelengths of light to propagate along the device.

Sensing apparatus comprising the strain sensor may employ a light detector arranged to detect light reflected from the gratings back down an input length of fibre, or alternatively may be arranged to measure light transmitted through the gratings and output along an output length of fibre connected to an end of the second FBG.

The strain sensor may comprise additional FBG's connected in series with the first and second, and each connecting length of fibre may incorporate a tapered section.

The minimum acceptable bend radius of the waist portion depends on the waist portions cross-section, and for taper waist diameters of for example 20 microns and smaller, the minimum bend radius may be as small as 1 mm.

The present invention allows the construction of a fibre optic strain rosette (with concomitant advantages of optical fibre sensors) that is both compact and has a minimum number of fibre leads.

Advantageously the connecting length may be formed of single mode optical fibre, and the reduced cross-sectional area of the waist may be less than half the nominal cross-sectional area of the untapered single mode fibre.

Ends of the connecting length may comprise untapered portions of the single mode fibre, as stated above, single mode (also known as mono mode) fibres comprise a core surrounded by sheath of cladding material having a lower refractive index end than the core. The core is typically circular with a sufficiently small diameter such that only the fundamental mode can propagate down the untapered fibre. This fundamental mode is guided in the untapered fibre by the core-cladding boundary. The core diameter is typically smaller than 15 microns but other sizes are also known. Reducing the cross-sectional area in the waist portion by a factor of at least two ensures that the fundamental mode can no longer practically be confined and guided by the core material-cladding material interface in the taper waist. In this situation, the fundamental mode is guided by the cladding material external boundary (typically the interface with the encapsulating or potting material or air) as it propagates down the taper waist, and the core no longer plays a role. Initially, the fundamental mode propagates along the untapered portion of the fibre guided by the fibre core. On entering the taper transition region it sees a core of gradually reducing cross-section. There comes a point where the core is too small to guide the fundamental mode, which then "breaks out", to be guided by the external boundary of the cladding, i.e. the propagating light field is now over the entire waist cross-section.

It is known that a sufficiently tapered region of an isolated single mode fibre is less prone to bend loss than the untapered fibre because the fundamental mode, previously weakly confined by the core-cladding boundary, is strongly confined in the tapered region by the cladding-air boundary. For example, in the paper "Miniature High Performance Loop Reflector", Oakley et al, Electronics Letters, Dec. 5th, 1991, Volume 27, Number 25 PP2334–2335, it is reported that a 1.5 mm diameter bend can be formed without introducing measurable loss (i.e. in this case less than 0.05 dB) in a tapered waist region of a single mode fibre, the untapered fibre having a core diameter of 10 microns, a cladding diameter of 125 microns, and a cut-off wavelength of 1250 nanometres, and the cladding diameter in the taper waist originally reported as being 30 microns. The true cladding diameter in the taper waist was in fact 15 microns, as was reported in a correction published later. In contrast, the minimum bend diameter of the untapered fibre consistent with low loss was approximately 4 cm.

It has been determined that in embodiments of the present invention, by drawing down the optical fibres sufficiently to ensure detachment of the input fundamental mode field from the input fibre core in the taper transition region, the taper waist portion can incorporate a sharp bend with negligible additional loss. Advantageously, the taper waist portion may have a diameter of less than 50 microns.

Preferably, the taper waist portion may have a "diameter" of 30 microns or smaller. In general, the smaller the diameter of the taper waist the tighter the bend which can be made without introducing unacceptable loss. However, the minimum diameter is determined by the wavelength of the light that the waist is intended to guide.

Using tapered regions of single mode fibre as connecting lengths, the connecting lengths can be routed between the FBG's by means of bends in the waist of radii of 2 mm or smaller, and hence the overall size of the device can be significantly reduced compared with prior art arrangements.

Advantageously the connecting length may be formed of optical fibre having a core surrounded by cladding material, the cladding material having a refractive index, and the tapered portion may be contained in a first body of a first medium having a refractive index lower than the cladding material refractive index, the first body directly contacting the surface of the tapered portion.

Containing the tapered portion in such a medium maintains the strong guidance of light in the waist, enabling sharp bends to be formed in it without appreciable loss. Containment also protects the waist portion from disturbances and contamination, and may provide good adhesion to a second body containing the first.

The first body may be a coating covering the surface of the tapered portion.

The first body may extend along the entire waist portion and may completely or partially cover, coat or encapsulate the taper transition portion.

Preferably, the first body is a body of clear silicone rubber. This material has a refracture index sufficiently low to maintain strong light guidance in the waist portion, and results in no extra loss in the bent waist. Silione rubber protects the waist portion(s) and does not allow significant strain to be transmitted to the bent waist(s). The flexible silicone rubber may thus prevent the strain which the sensor is monitoring from causing unacceptable increases in losses in the bent taper waist portions.

The strain sensor may be further contained (encapsulated) in a second body of a second medium, which may be the same or different from the first medium. Preferably the second body is a body of substantially rigid material, such as epoxy resin, capable of transmitting strain to the Bragg gratings.

In order to provide even stronger guidance of light in the waist portion of the connecting length, in certain embodiments of the present invention a layer or pocket of gas is trapped in an encapsulating body containing the fibre Bragg gratings and the connecting portion, the layer or pocket surrounding the taper waist portion. The pocket may extend to fully surround the tapered portion. Light is strongly guided by the waist portion cladding material—gas interface and small diameter, loss-free bends can be formed. The gas may for example, be air, and/or may be at low pressure such that the pocket essentially contains a vacuum.

To facilitate the trapping of a gas pocket around the taper portion, the sensor may include a tubular sleeve, surrounding and extending along the tapered portion. The sleeve may extend to, and form a loose seal with, the FBG's and/or untapered sections of the connecting length, and in arrangements where the device is encapsulated (potted) the sleeve may prevent the encapsulating material from contacting the taper waist portion.

In alternative embodiments, bubbles of gas are formed in the potting material around the tapered portions.

To minimise losses, the first and second FBG's and the connecting length may be formed from a continuous single optical fibre, which may be a single mode fibre.

Preferably, the sensor comprises a body of silicone rubber (clear) which coats or encapsulates the waist portion and so is in contact with the waist portion surface, and a body of rigid material encapsulating both the silicone rubber body and the fibre Bragg gratings. Thus, the rigid material is in contact with the surface of the Bragg gratings, but is separated from the surface of the taper waist portion by the silicone rubber.

Strain applied to the sensor (i.e. to the rigid encapsulating body) can thus be transmitted to the fibre Bragg gratings, but is not transmitted to the bent waist portion(s) because of the flexible encapsulating/coating body of silicone rubber.

Preferably, the sensor comprises two rigid plates, with the FBGs and connecting length sandwiched between. Preferably, only the FBGs are bonded to the plates, the taper waist portion being unsupported. Thus, strain applied to the plates can be transmitted to the FBGs but not to the bent tapered connecting portion. Thus, increases in losses in the or each bend when strain is applied to the sensor can be avoided or at least rendered insignificant.

Preferably, the plates are in close contact with the FBGs, i.e. the separation of the plates is basically just the diameter of the FBGs. A small quantity of bonding material can then be used to bond the FBGs to the plates. Even when the plates are separated by the minimum possible distance (set by the FBG diameters) the taper waist portion, having reduced diameter, is not trapped by the plates and can be left unsupported in air to improve light guidance. Thus, the sensor may have a laminar structure.

BRIEF DESCRIPTION OF THE SEVERAL VIEWS OF THE DRAWINGS

Embodiments of the present invention will now be described with reference to the accompanying drawings in which:

FIG. 2b shows the variation of core refractive index along the FBG of FIG. 2a;

FIG. 6 is a schematic diagram of an embodiment of the present invention;

FIG. 7 is a more detailed schematic diagram of the embodiment of FIG. 6;

FIG. 18 is a schematic side view of a strain sensor in accordance with a further embodiment.

DETAILED DESCRIPTION OF THE INVENTION

Referring now to FIG. 6, in this example three FBG's 1A, 1B, 1C are connected in series by connecting portions 6 of optical fibre. The connecting portions incorporate bends B of radius less than 10 mm formed in the waist portions of tapered portions of the connecting lengths. Although the FBG's are arranged at 0, 45 and 90° to a nominal axis, sharp bends in the connecting portions enable routing between the FBG's to be more direct than in prior art arrangements. Large diameter loops are not required.

FIG. 7 shows the embodiment of FIG. 6 schematically in more detail. The FBG's and connecting portions 6 are formed from a continuous single length of single mode fibre to minimise losses (i.e. there are no joints or splices). Each connecting portion comprises a tapered portion consisting of taper transition portions 61 and a waist portion 62. The cross-sectional area of the waist portion has been reduced sufficiently so that the single mode of light cannot practically be guided by the residual core in the waist. The core reduces in cross-sectional area 611 through the taper transition portions.

Figure 1:
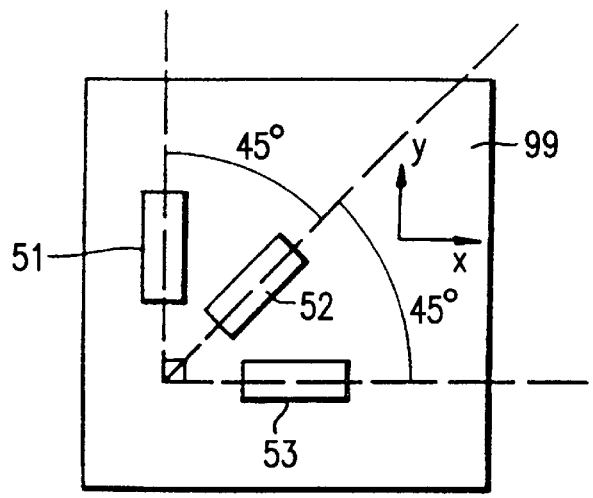
FIG. 1 is a schematic diagram of a known electrical strain rosette.
Figure 2A:
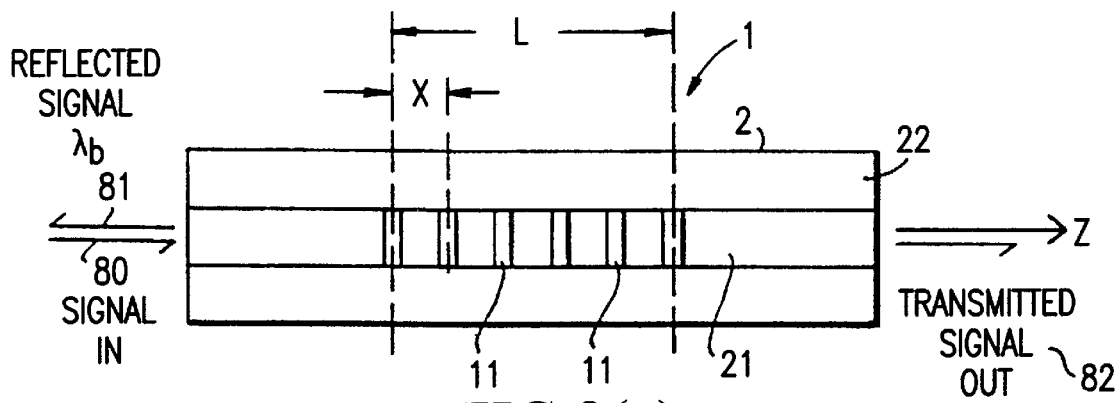
FIG. 2a is a schematic diagram of a known fibre Bragg grating.
Figure 2B:
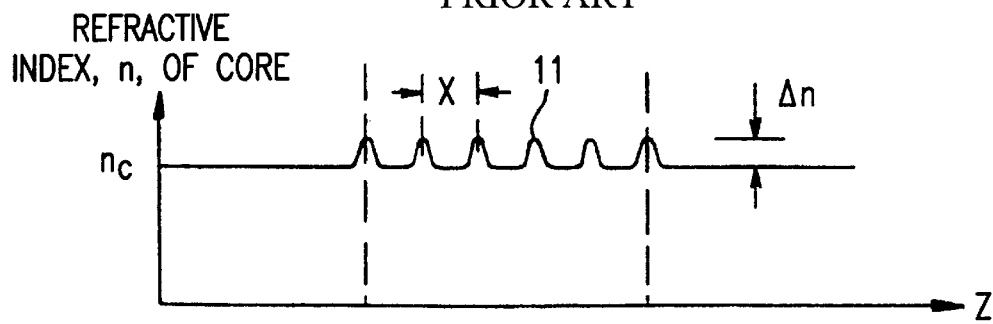
Figure 3:
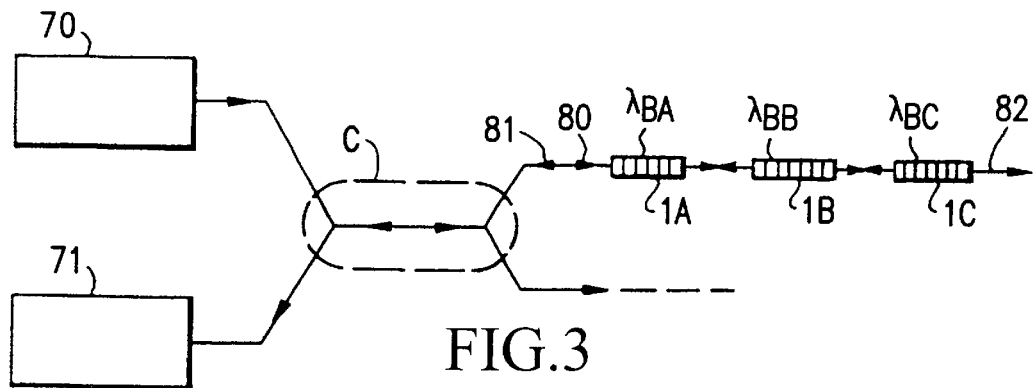
FIG. 3 is a schematic diagram of sensing apparatus comprising multiplexed FBG's.
Figure 4:
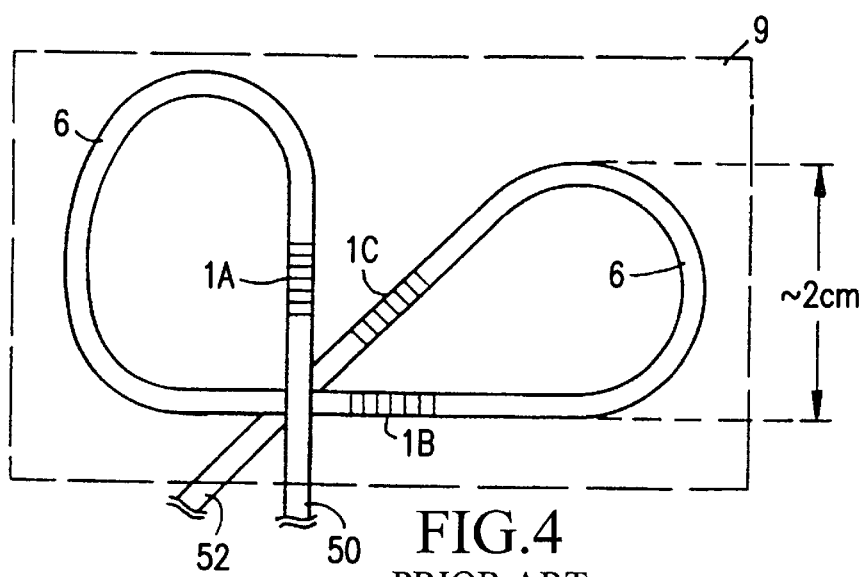
FIG. 4 is a schematic diagram of a known strain rosette incorporating FBG's.
Figure 5:
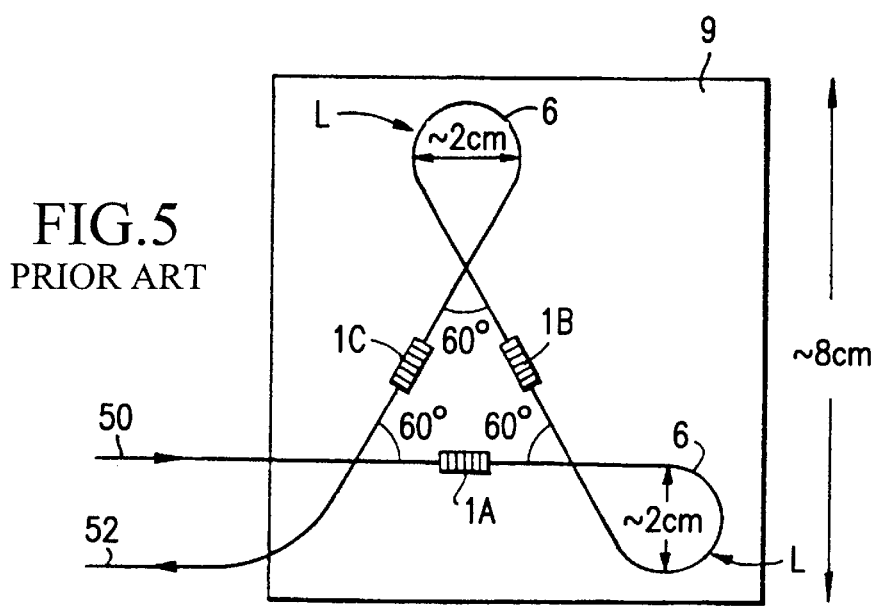
FIG. 5 is a schematic diagram of another known strain rosette employing FBG's.
Figure 8:
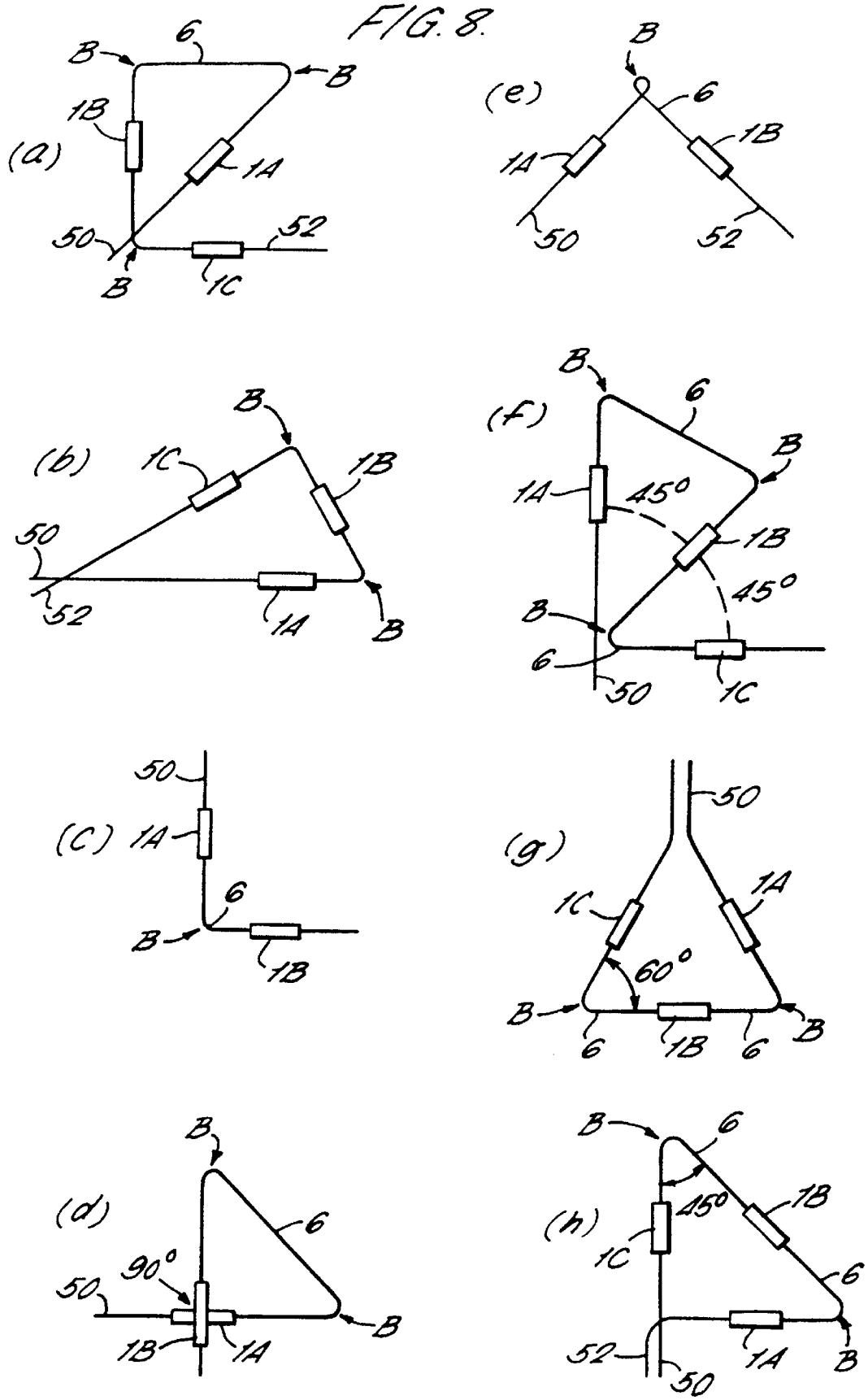
FIG. 8 is a schematic diagram of various embodiments of the present invention.

Referring now to FIG. 8, this figure shows schematically a variety of embodiments of the present invention. In each case, the connecting lengths 6 of optical fibre connecting the FBG's 1A, 1B, 1C include tapered portions, and bends B are formed in the waists of the tapered portions, the bends having a minimum radius of curvature of less than 10 mm.

FIG. 8a shows a rectangular strain rosette, the three FBG's being connected by means of three bends B.

FIG. 8b shows a so called delta rosette in which the three FBG's are connected by two bends.

FIG. 8c shows part of a strain sensor incorporating two FBG's connected by a single bend B and arranged substantially at 90° to each other.

FIG. 8d shows a nominally planar strain sensor, in which the thin FBG's are arranged one on top of another, crossing at 90°, and connected by connecting length 6 incorporating two bends B. By overlapping the FBG's in this way the size of the sensor is further reduced. As the diameters of the fibres comprising the FBG's are small, the crossed FBG's can be potted in a thin film to form a manageable, practically two dimensional strain sensor.

FIG. 8e shows an embodiment in which the bend B formed in the waist of the connecting length is in fact a small loop, having a radius of curvature substantially less than 10 mm.

FIGS. 8f, g and h show alternative arrangements of three element strain rosettes embodying the present invention.

Figure 9:
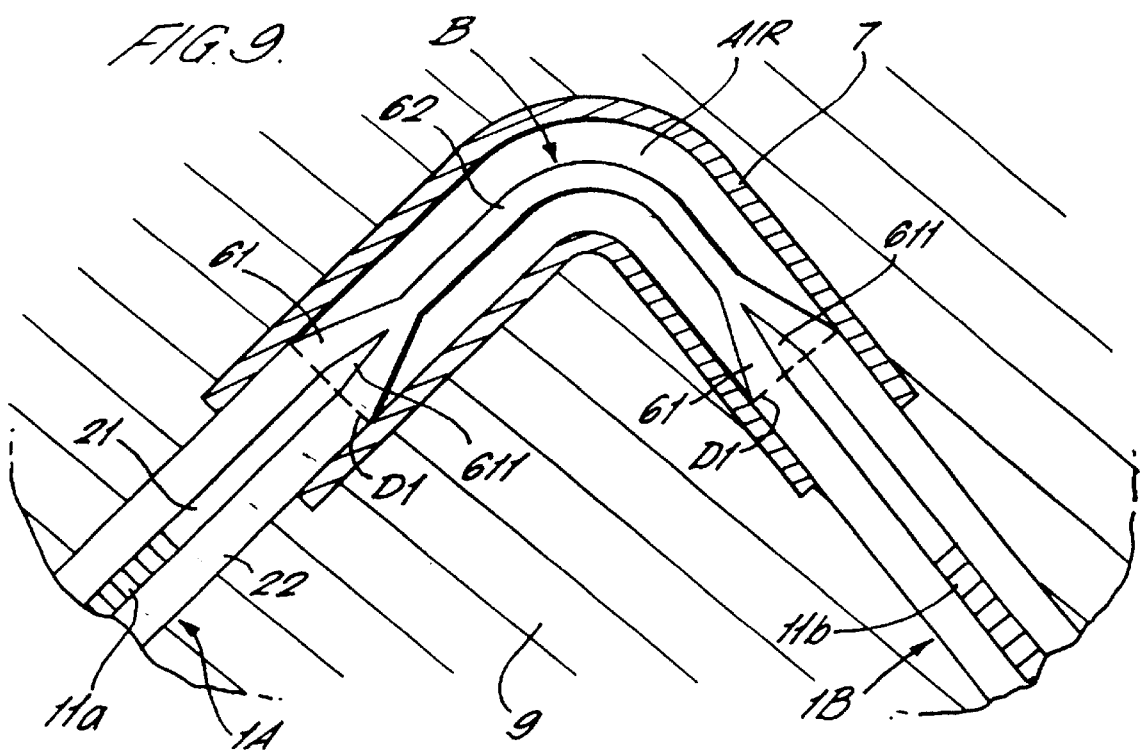
FIG. 9 is a schematic diagram of part of a strain sensor embodying the present invention.

FIG. 9 shows in detail part of a sensor embodying the present invention. In this schematic diagram, the diameter of the fibres are exaggerated for illustration. In this example, the two FBG's 1A, 1B and the connecting length 6 are formed from a single continuous length of optical fibre having a core 21 surrounded by cladding 22. At an end of the first FBG 1a the fibre tapers down over a taper transition portion 61, 611 to a taper waist portion 62 of approximately constant cross-sectional area. At the second end of the waist portion, the fibre tapers out over a second taper transition portion connecting to an end of the second FBG 1b.

Thus, in this example the connecting length consists entirely of tapered portion 61, 611, 62. The extent of the connecting length is shown bounded by the broken lines D1. Within the taper transition portion the core 21 tapers down 611 to such an extent that in the waist portion it no longer plays a significant role in guiding light.

A flexible tubular sleeve 7 surrounds and extends over the entire length of the tapered portion and forms a seal with both FBG's. A pocket or layer of air is trapped inside the tube 7 and so over its entire length, the tapered portion is sheathed by gas, having a low refractive index. Light propagating along the tapered portion from one FBG to the next is strongly confined and guided by the cladding material-air interface and arranging the tapered portion to be surrounded by gas, even tight bends in the taper waist portion may be formed without loss.

Although in this example the waist portion 62 does not touch the inside of the tube 7, in other embodiments some contact is acceptable.

The embodiment of FIG. 9 has been formed by sliding the tube 7 over the tapered portion and then encapsulating (also known as potting or encasing) the device in a thin film of encapsulating material, the material being chosen to have a refractive index lower than that of the cladding 22. The encapsulating material 9 is in direct contact with the FBG's, but is prevented from contacting the tapered portion by the tube 7 and trapped air. Clearly, if the viscosity of the encapsulating material prior to curing is sufficiently high, then the tube 7 may be able to exclude the material from the region surrounding the taper portion without having to form good seals to the FBG's.

Figure 10:
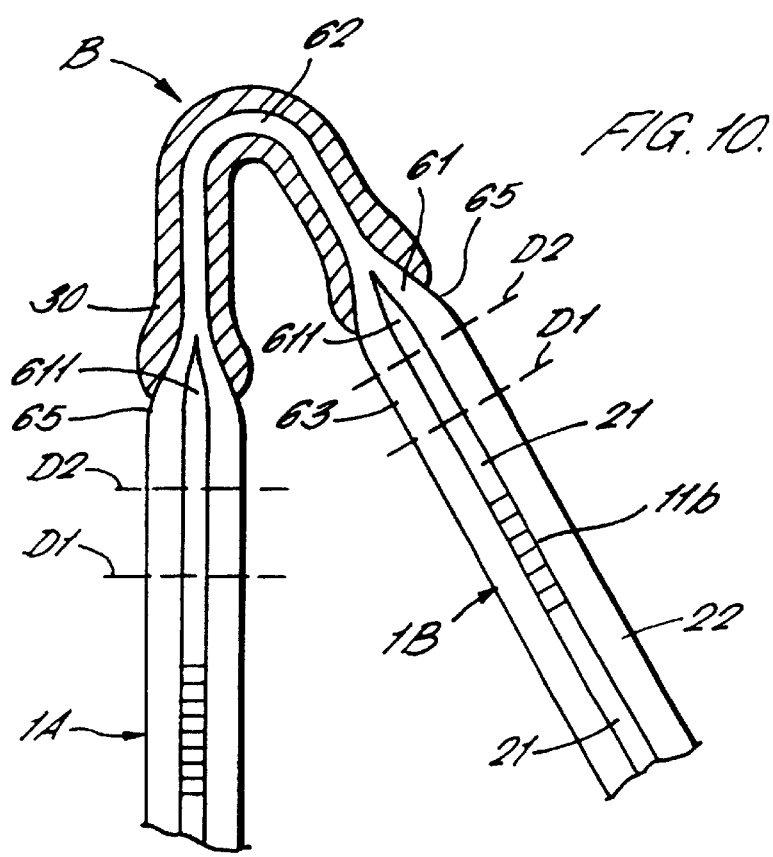
FIG. 10 is a schematic diagram of part of a further embodiment.

Referring now to FIG. 10, this embodiment the connecting length and FBG's are formed from a length of single mode optical fibre. The connecting length consists of two untapered portions 63 of the fibre at its ends, on either side of the tapered portion consisting of two taper transition portions 61, 611 connected by a waist portion 62. To route the connecting length between the FBG's a single bend B is formed in the waist portion 62, the bend having a minimum radius of less than 2 mm.

The waist portion 62 and part of the taper transition portions are coated with a material 30 having a refractice index lower than that of the cladding material 22. In this example, the coating does not entirely cover the tapered portion, and sections of its surface 65 are uncoated.

The coating protects the taper waist and maintains strong light guidance, minimising bend loss.

The sensor may also be potted in a layer or film of suitable material to fix the relative positions of the FBG's and facilitate handling.

Figure 11:
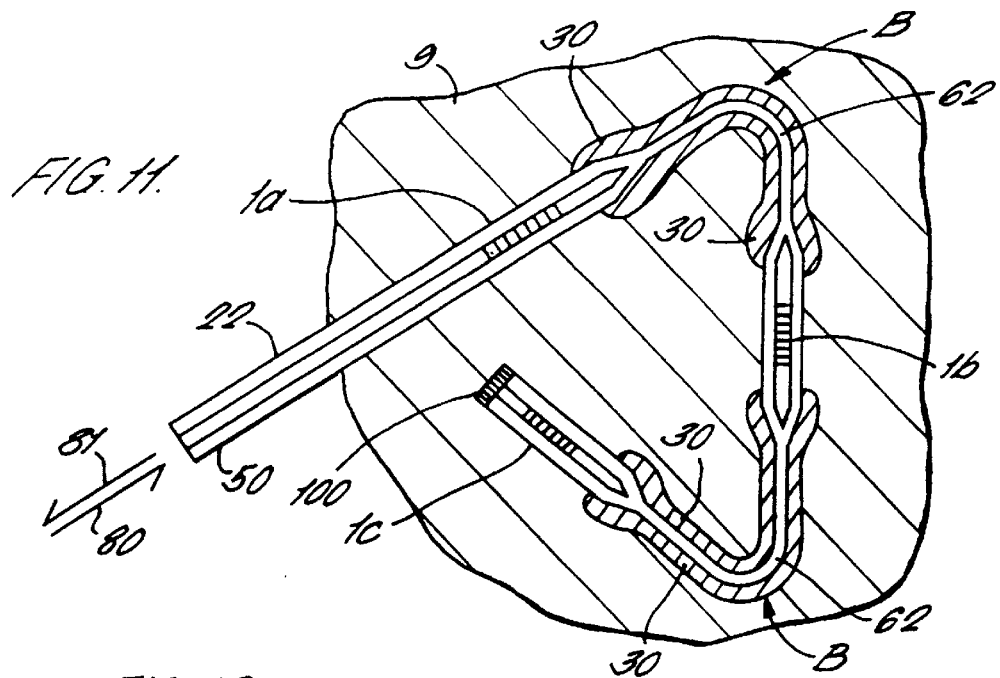
FIG. 11 is a schematic diagram of a strain rosette embodying the present invention.

FIG. 11 shows a strain rosette embodying the present invention and comprising three FBG's arranged at 60° to one another in delta configuration. A single length of fibre 50 acts as the input lead to and output lead from the series connected sensors. The routing between the FBG's is achieved by means of two bends B in the tapered waist portions 62 of the connecting lengths, and the entire lengths of the connecting portions are encapsulated in material 30 having lower refractive index than the cladding 22. In this example, the encapsulation of the connecting lengths extends to cover part of the fibre Bragg gratings themselves.

At an end of the third fibre Bragg grating 1c there is provided a non-reflecting, absorbing surface.

This terminating surface ensures that the only light returning down the input/output fibre 50 is light reflected by the gratings at their characteristic Bragg wavelengths. By incorporating a non-reflecting terminating means at one end of the fibre Bragg grating string the number of fibre leads to the device is minimised.

The fibre optic components of the sensor are further enclosed in a thin film 9 of suitable material. When cured, the film material is substantially rigid, to transfer strain to the FBG's, and has a refractive index lower than that of the cladding material 22.

Figure 12:
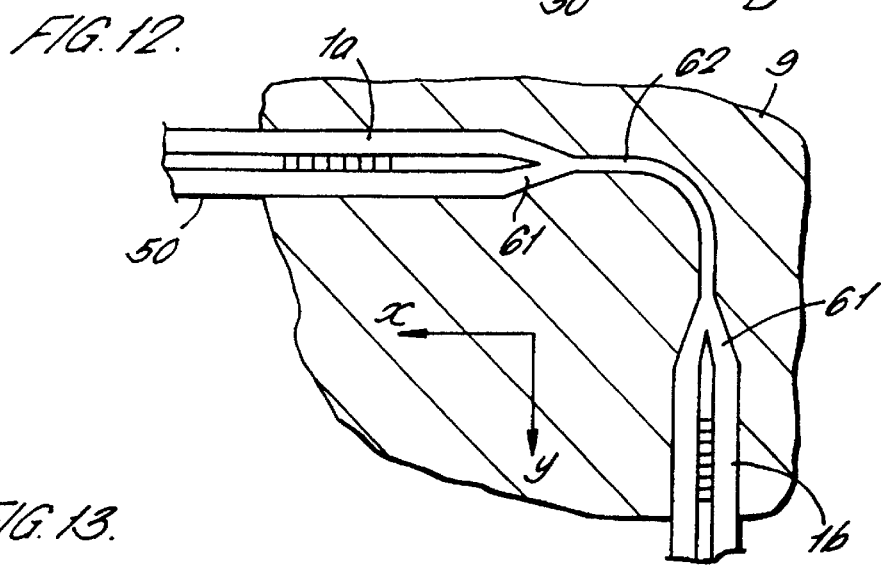
FIG. 12 is a schematic diagram of another strain rosette embodying the present invention.

In the embodiment of FIG. 12, a single body of material 9 encapsulates and is in direct contact with the surfaces of the FBG's and the tapered portion of the connecting length.

Figure 13:
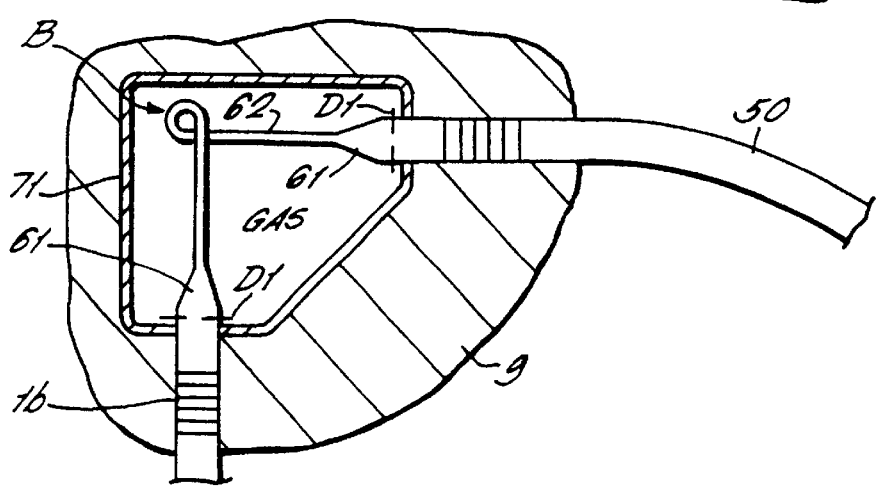
FIG. 13 is a schematic diagram of a further embodiment.

Turning now to FIG. 13, in this embodiment the two FBG's 1a, 1b have been formed in a series along a continuous length of optical fibre being uniform across its width, i.e. it has no separate cladding. A connecting length, shown bounded by broken lines D1, includes a tapered section consisting of taper transitions 61 and a waist 62. The waist portion includes a bend B of radius 1 mm and is formed as a loop. The whole tapered portion is encapsulated in a pocket of gas trapped inside the potting material 9. The gas pocket is enclosed by an enclosing structure 71 which prevents the encapsulating material 9 from coming into contact with the taper portion during the potting process.

Figure 14:
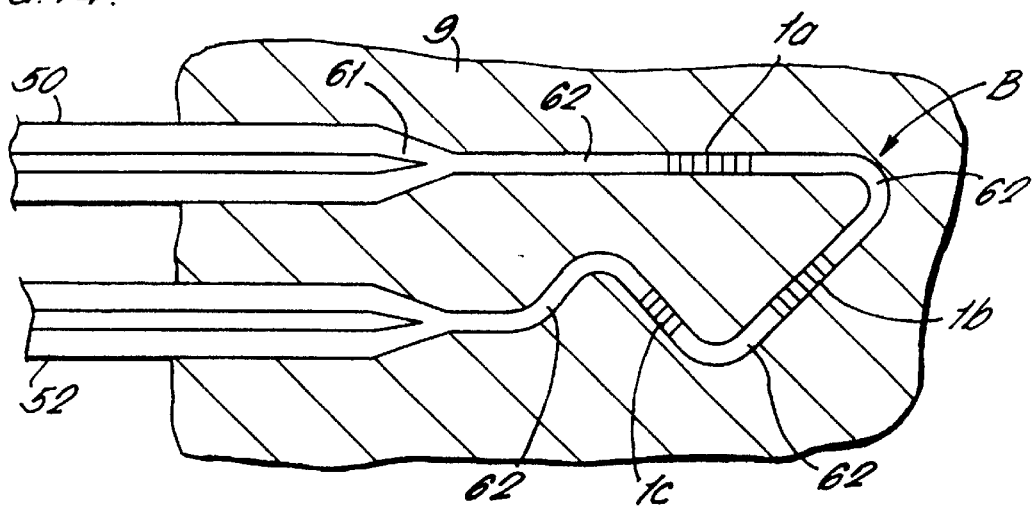
FIG. 14 is a schematic diagram of another embodiment.

FIG. 14 shows a strain rosette in accordance with the present invention and comprising input 50 and output 52 portions of optical fibre. The optical fibre is single mode fibre and the FBG's 1a, 1b, 1c are formed in the waist portion 62 of a tapered portion of the fibre. Further waist portions connect the FBG's and incorporate bends of radius less than 1 mm. By forming the FBG's in the waist portion the size of the rosette can be dramatically reduced compared with previous arrangements. The rosette is encapsulated in a suitable material 9.

Figure 15:
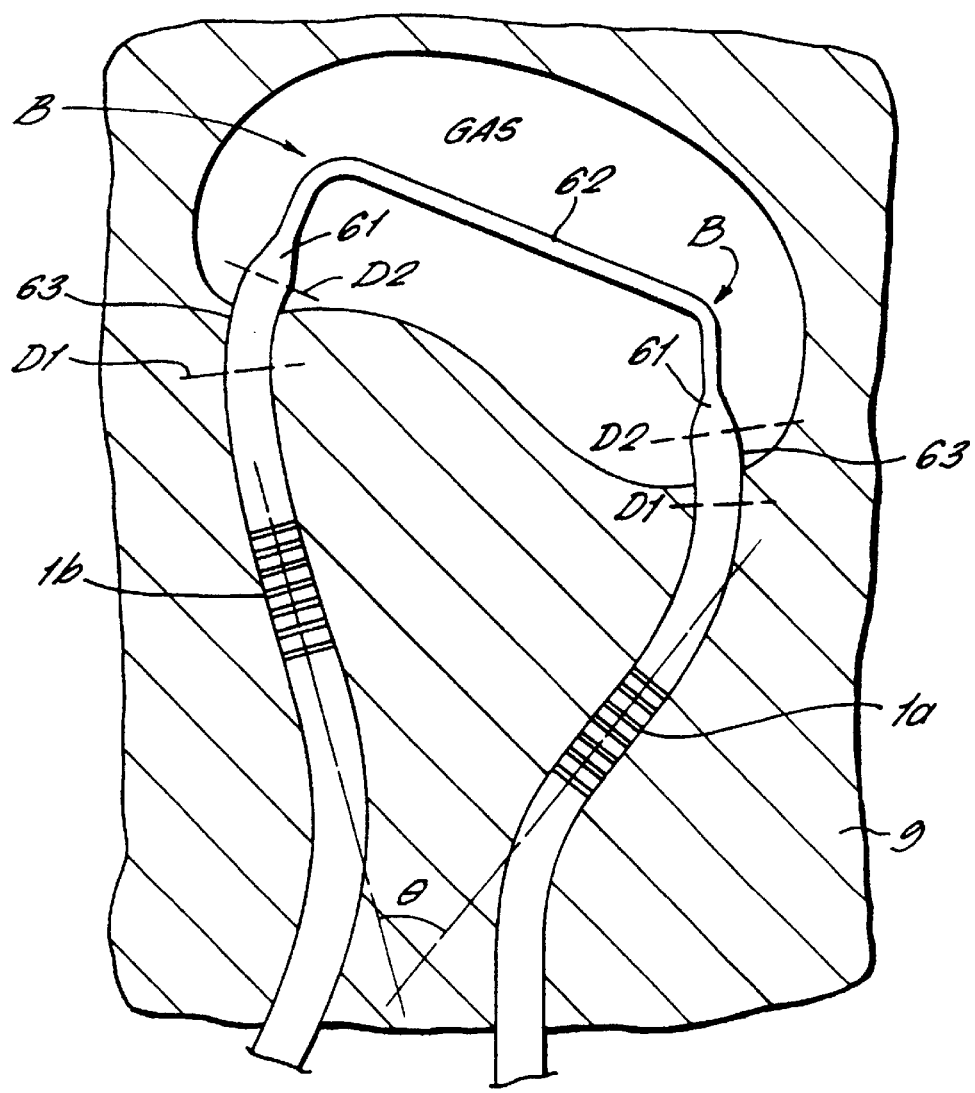
FIG. 15 is a schematic diagram of a strain sensor embodying the present invention.

FIG. 15 shows a further embodiment in which substantially straight fibre Bragg gratings 1a, 1b are arranged at an angle θ with respect to one another and encased in a film of material 9. The FBG's are formed in a continuous length optical fibre, and the connecting length which is bounded by broken lines D1 includes untapered portions in 63 which are arranged in curves having minimum radii no smaller than 1 cm. The tapered portion of the connecting length, shown bounded by broken lines D2 incorporates two sharp bends B in the waist 62 and the routing of the connecting length between the FBG's is achieved substantially by means of the bends B. The entire tapered portion 61, 62 of the connecting length is enclosed is a bubble of gas formed in the encapsulating material 9.

Figure 16:
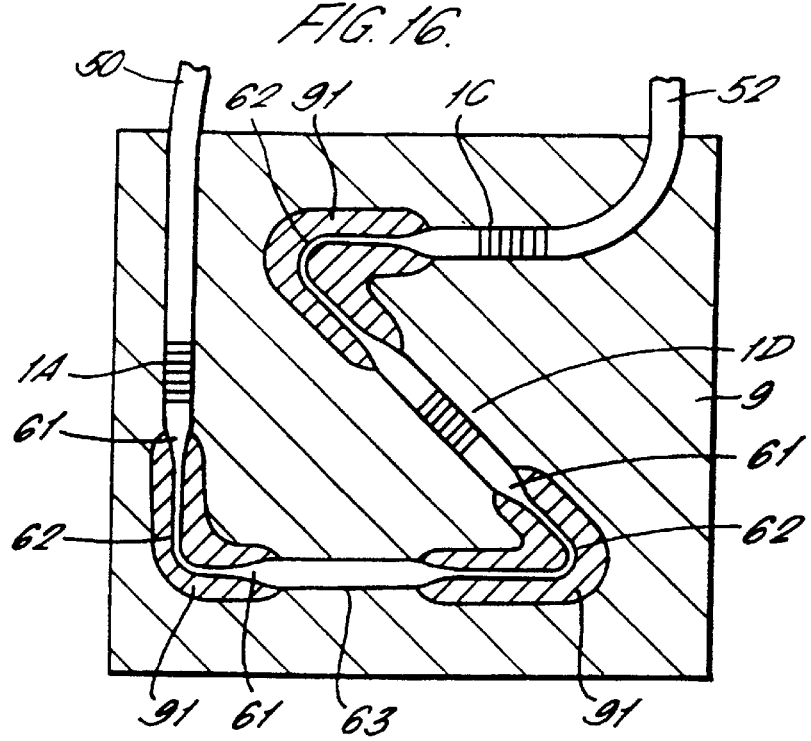
FIG. 16 is a schematic diagram of a strain rosette embodying the present invention.

FIG. 16 shows a rectangular three element strain rosette in accordance with an embodiment of the present invention. First and second FBG's 1a, 1b are connected by a connecting length which includes an untapered portion 63 between two tapered portions 61 and 62. The untapered portion 63 is substantially straight and bends are formed in the taper waist portions 62 the taper waist portions 62 and taper transition portions are encapsulated in a material 91 which when cured is substantially flexible and has a refracted index lower than that of the constituent optical fibres. A second connecting length connects the second and third FBC's and is also encapsulated in flexible material 91. A substantially rigid film 9 is formed around the device, coming into direct contact with the FBG's and the outer surfaces of the encapsulating flexible sections 91. The substantially rigid material 9 is able to transfer strain to the FBG's and the flexible portions 91 provide a degree of strain relief to the tapered portions. Also, the flexible material 91 may have a lower refractive index than is available from rigid encapsulants.

In this example, the flexible material is clear silicone rubber. Encapsulating the bends in this material results in no additional loss.

Figure 17:
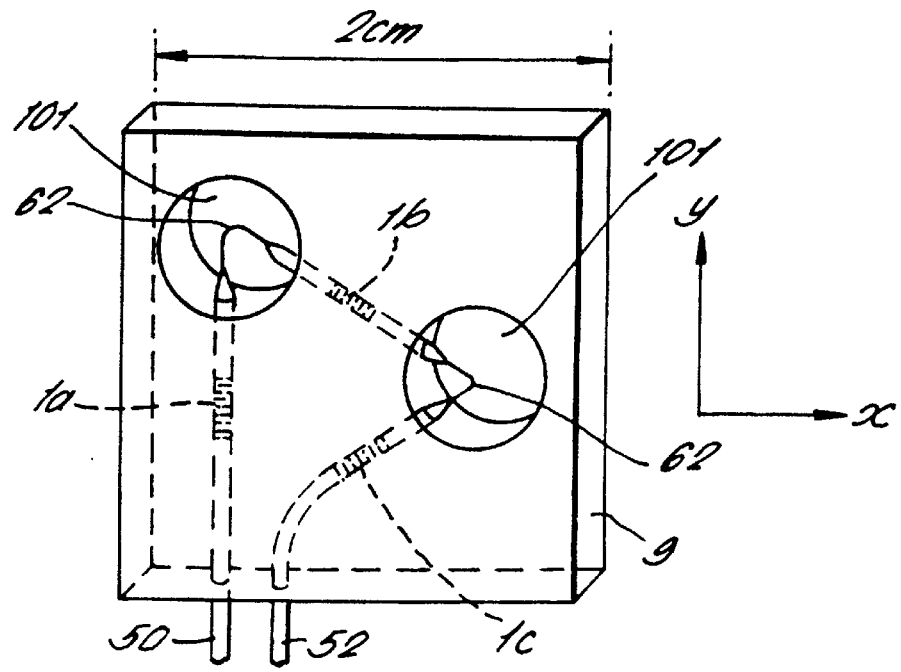
FIG. 17 is a schematic diagram of a strain rosette in accordance with a further embodiment of the present invention.

FIG. 17 shows a further embodiment in which three FBG's are encased in a film 9 of material and the waist portions of the connecting lengths are arranged in apertures or voids 101 formed in the film. These voids may be formed by excluding the film material from the taper waist portions during the encapsulation process, or alternatively may be formed by etching away the encapsulating material after it has cured or set. Further films of suitable material may be bonded on either side of the film 9 and may thus trap gas in the voids 101. This is a convenient way of fabricating devices in which strong guidance of light is maintained in the bend in the taper waist portion, by arranging the surface of the waist portion to be in contact with a gas.

The device of FIG. 17 is approximately square having a side of 2 cm.

FIG. 18 shows a schematic side view of a further embodiment. In this example, three fibre Bragg gratings 1a, 1b, 1c are sandwiched between two parallel rigid plates $P_T$, $P_B$. The separation of the top $P_T$ and bottom $P_B$ plates in such that they are in close contact with the FBGs(separation is equal to untapered fibre diameter). The FBGs are each glued (bonded) to the plates, and strain on the plates can be transmitted to the FBGs. The taper waist portions 62 have reduced diameter and so are not in contact with the plates. The taper waist portions are not encapsulated in silicone rubber or epoxy resin, but are surrounded by air in the space between the plates. Plate strain cannot be transmitted directly to the taper waist portions. The taper waist portions incorporate 90° bends and the "front" facing surfaces 61f of the taper transition portions of the first and third FBGs 1a, 1c can be seen on the figure.

Sensors in accordance with the present invention can be used as surface attached sensors, or as sensors embedded into structures and components made of composite materials, e.g. carbon fibre reinforced composites or cement based materials.

For the latter applications, the complete sensor or rosette requires encapsulation for protection and strengthening during the embedding process. In particular, this is essential for the bent taper waist sections which are inherently fragile having had protective coatings removed, and having been significantly reduced in diameter by the tapering or pulling process. The bends in the taper waist portions will also become very lossy if subject to uncontrolled distortions, being especially sensitive to distortions of the taper transition regions. Furthermore, if the surrounding material does not have a sufficiently low refractive index, light will be lost through the partial or complete reduction in wave guiding capabilities of the bent waist.

Even for surface applications, encapsulation is also required in order that the rosette may be conveniently and safely handled and applied to the test surface.

Thus, in embodiments of the present invention the rosette may be encapsulated in a moulded material such as epoxy having a refractive index substantially less than the material forming the optical fibre cladding.

The rosette may be encapsulated in a moulded material such as epoxy, while the bent taper waist regions are surrounded by epoxy having a refractive index substantially less than the material forming the optical fibre cladding, where the surrounding epoxy may be applied either during the moulding or alternatively, coated prior to the encapsulation.

Alternatively, the rosette may be encapsulated in a moulded material such as epoxy, while the bent tapered portions are contained within thin flexible tubes which allow the bent waist to be substantially free from contact with the tube walls, although some contact is acceptable.

As an alternative to epoxy, silicone rubber may be used, for example as a potting, moulding or encapsulating material or as a coating material.

Other suitable materials may of course be used, and in certain embodiments a number of different materials may be employed, for example a first material coating the bent tapered portions and a second material encapsulating the sensor.

Each feature disclosed in this specification (which term includes the claims) and/or shown in the drawings may be incorporated in the invention independently of other disclosed and/or illustrated features.

What is claimed is:

1. A strain sensor comprising:
   first and second fibre Bragg gratings, and
   a length of optical single mode fibre connecting the gratings in series,
   each grating being substantially straight,
   the first and second gratings being non-parallel and having different nominal Bragg wavelengths,
   the connecting length of optical single mode fibre having a bend and including a portion that is tapered including an elongate waist portion having a reduced cross-sectional area,
   said bend being formed in the waist portion.

2. A strain sensor in accordance with claim 1, wherein said reduced cross-sectional area is less than half a nominal cross-sectional area of an untapered portion of the single mode fibre.

3. A strain sensor in accordance with claim 1, wherein the connecting length is formed of optical fibre having a core surrounded by continuous cladding material, the cladding material having a refractive index, and the sensor further comprises a first body of a first medium having a refractive index lower than said cladding material refractive index, said first body containing and contacting the surface of the tapered portion.

4. A strain sensor in accordance with claim 3 wherein said first body comprises a coating covering the surface of the tapered portion.

5. A strain sensor in accordance with claim 3, comprising a second body of a second medium encapsulating the tapered portion and the fibre Bragg gratings, the second medium being separated from the surface of the tapered portion by said first body.

6. A strain sensor in accordance with claim 1, comprising a continuous encapsulating body containing the fibre Bragg gratings and the connecting portion, and a pocket of gas trapped in said encapsulating body and surrounding the tapered portion.

7. A strain sensor in accordance with claim 6, comprising a tubular sleeve surrounding and extending along the tapered portion and containing the gas pocket.

8. A strain sensor in accordance with claim 1, wherein the first and second fibre Bragg gratings and the connecting length are formed of a continuous optical fibre.

9. A strain sensor in accordance with claim 1, wherein the two fibre Bragg gratings are substantially co-planar and are arranged to form at least part of a strain rosette.

10. A strain sensor in accordance with claim 1, comprising a continuous body of silicone rubber coating or encapsulating the waist portion such that the silicone rubber is in contact with the surface of the waist portion, and a body of substantially rigid material encapsulating the body of silicone rubber and the fibre Bragg gratings.

11. A strain sensor in accordance with claim 1 comprising two substantially rigid plates arranged substantially parallel, wherein the fibre Bragg gratings and connecting length are arranged between the plates in a plane parallel to the plates, and the fibre Bragg gratings are each rigidly bonded to the plates.

12. A strain sensor in accordance with claim 11, wherein the plates are separated by a distance substantially equal to a nominal diameter of the fibre Bragg gratings.

13. A strain sensor in accordance with claim 11, wherein the waist portion is not rigidly bonded to the plates.

14. Sensing apparatus comprising: a strain sensor in accordance with claim 1;
   a light source arranged to input light to the gratings; and
   a light detector arranged to detect light reflected by or transmitted through the gratings,
   the light source and light detector being operable to provide an indication of the Bragg wavelengths.

* * * * *